(12) United States Patent
Crittenden

(10) Patent No.: US 9,109,389 B1
(45) Date of Patent: Aug. 18, 2015

(54) HOLLOW CORE DOOR WITH INTERNAL AIR FLOW

(71) Applicant: Jerry G. Crittenden, Phoenix, AZ (US)

(72) Inventor: Jerry G. Crittenden, Phoenix, AZ (US)

( * ) Notice: Subject to any disclaimer, the term of this patent is extended or adjusted under 35 U.S.C. 154(b) by 0 days.

(21) Appl. No.: 14/120,870

(22) Filed: Jul. 7, 2014

(51) Int. Cl.
*E06B 7/10* (2006.01)
*E06B 7/02* (2006.01)

(52) U.S. Cl.
CPC .................................. *E06B 7/02* (2013.01)

(58) Field of Classification Search
CPC .................................................... E06B 3/7001
USPC .......... 454/195, 237, 238, 245, 906; 181/290; 49/171; 52/783.12, 784.1
See application file for complete search history.

(56) References Cited

U.S. PATENT DOCUMENTS

| 65,451 | A | * | 6/1867 | Timby ........................... 454/195 |
|---|---|---|---|---|
| 465,708 | A | * | 12/1891 | Bishop .......................... 454/195 |
| 485,141 | A | * | 10/1892 | Smith ............................ 454/237 |
| 1,107,369 | A | * | 8/1914 | Shelton .......................... 52/455 |
| 1,896,053 | A | * | 1/1933 | Fisk ............................... 454/271 |
| 2,034,723 | A | * | 3/1936 | Fitch ............................. 454/195 |
| 2,272,829 | A | * | 2/1942 | Bohnsack ........................ 52/145 |
| 2,328,761 | A | * | 9/1943 | Wamnes et al. .................. 454/195 |
| 2,676,678 | A | * | 4/1954 | Jacobson ........................ 454/185 |
| 2,704,504 | A | * | 3/1955 | Wilkening ...................... 454/195 |
| 2,823,429 | A | * | 2/1958 | Grant ................................. 49/67 |
| 2,948,366 | A | * | 8/1960 | Kelly et al. ....................... 49/501 |
| 3,061,056 | A | * | 10/1962 | Kodaras ........................... 52/145 |
| 3,295,273 | A | * | 1/1967 | Wehe, Jr. .......................... 52/145 |
| 3,789,747 | A | * | 2/1974 | Wasserman et al. ............ 454/186 |
| 3,963,094 | A | * | 6/1976 | Nowikas ......................... 181/198 |
| 3,982,475 | A | * | 9/1976 | Wild .............................. 454/185 |
| 4,062,273 | A | * | 12/1977 | O'Connor ..................... 454/105 |
| 4,433,985 | A | * | 2/1984 | McGee ........................... 96/111 |
| 4,957,038 | A | * | 9/1990 | Hamilton ...................... 454/195 |
| 5,120,273 | A | * | 6/1992 | Lin ................................ 454/195 |
| 5,306,208 | A | * | 4/1994 | Sommerrock et al. .......... 454/68 |
| 5,623,783 | A | * | 4/1997 | Kenkel .............................. 49/21 |
| 5,782,055 | A | * | 7/1998 | Crittenden .................. 52/784.1 |
| 5,902,026 | A | * | 5/1999 | Swan et al. ................. 312/138.1 |
| 6,161,363 | A | * | 12/2000 | Herbst ........................ 52/784.15 |
| 7,646,603 | B2 | * | 1/2010 | Bard et al. ...................... 361/696 |
| 7,886,804 | B2 | * | 2/2011 | Goodman et al. .............. 160/199 |
| 7,974,094 | B2 | * | 7/2011 | Hendrix et al. ................ 361/695 |
| 8,100,225 | B2 | * | 1/2012 | Bartha et al. .................. 181/290 |
| 8,336,672 | B2 | * | 12/2012 | Derks et al. ................... 181/224 |
| 8,763,416 | B2 | * | 7/2014 | Hika et al. ....................... 62/298 |

(Continued)

*Primary Examiner* — Steven B McAllister
*Assistant Examiner* — Frances F Hamilton
(74) *Attorney, Agent, or Firm* — H. Gordon Shields

(57) ABSTRACT

Hollow core door apparatus for preventing the build up of pressure in a room having a register through which air flows into the room and a center panel in the door with at least a single opening through the center panel; the door has an inside door skin and an outside door skin, both of which include openings spaced apart from the center panel, and an inside panel and an outside panel disposed in the respective openings in the inside and outside door skins. The inside and outside panels are spaced apart from the center panel within the respective door skin openings, and the spacing within the door skin openings define peripheral openings at least as great as the area of the opening in the center panel and are offset from the opening in the center panel to provide for a non-linear flow of air through the door to prevent the build up of pressure in the room. Several different embodiments are illustrated. An embodiment combining a noxious gas absorbent material with the pressure build up prevention capabilities is also illustrated.

8 Claims, 12 Drawing Sheets

(56) References Cited

U.S. PATENT DOCUMENTS

| | | | |
|---|---|---|---|
| 8,898,973 B2* | 12/2014 | Miller | 52/209 |
| 2003/0183448 A1* | 10/2003 | Sleet et al. | 181/293 |
| 2004/0035085 A1* | 2/2004 | Crittenden | 52/784.1 |
| 2009/0185348 A1* | 7/2009 | Bretschneider et al. | 361/695 |
| 2011/0197766 A1* | 8/2011 | Bordin | 95/284 |
| 2011/0298347 A1* | 12/2011 | Birkenstock et al. | 312/295 |
| 2012/0003914 A1* | 1/2012 | Warner | 454/195 |
| 2014/0054107 A1* | 2/2014 | Thomas et al. | 181/290 |
| 2014/0246169 A1* | 9/2014 | Perrin et al. | 165/47 |

* cited by examiner

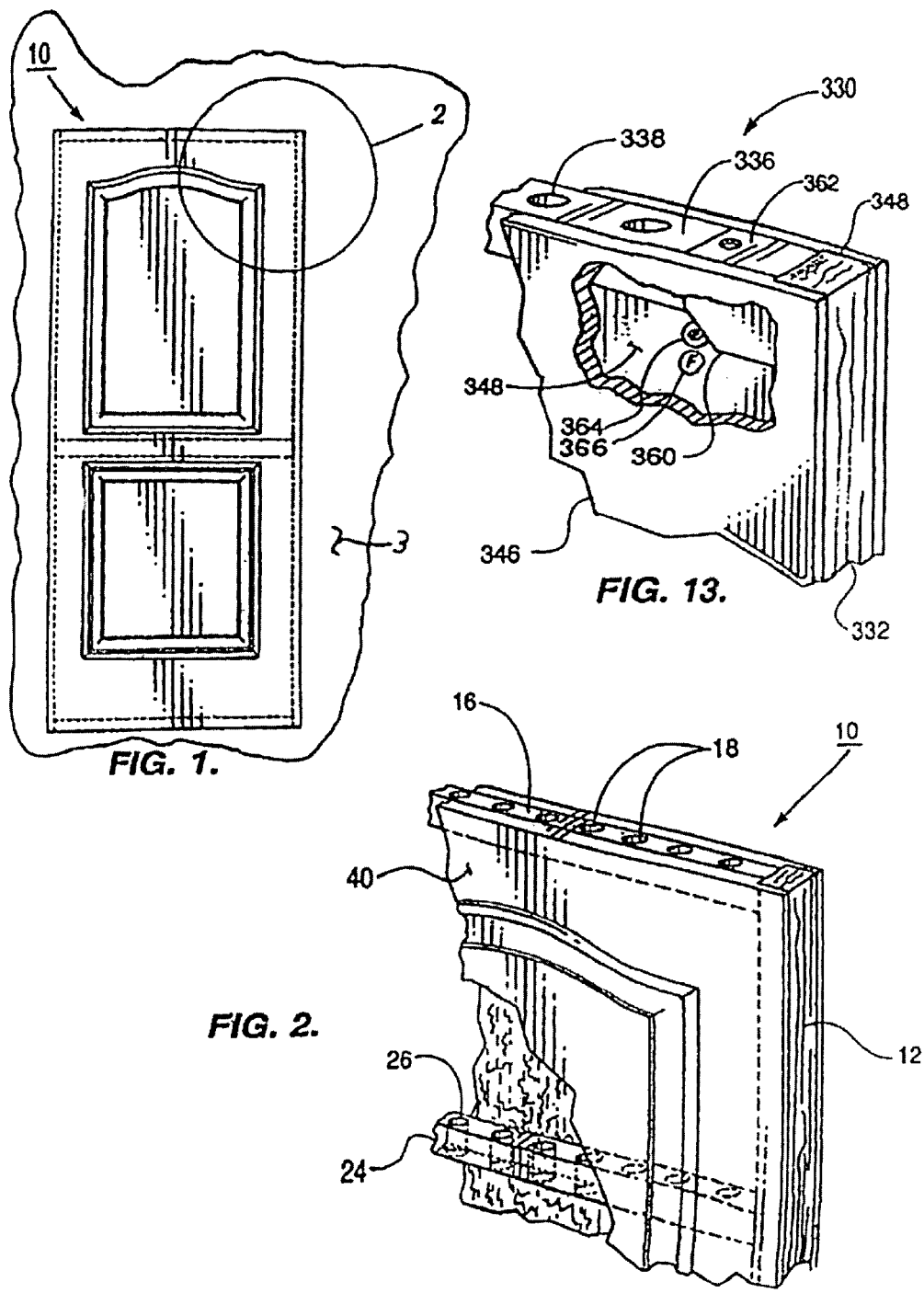

HOLLOW CORE DOOR WITH INTERNAL AIR FLOW

CROSS REFERENCE TO RELATED APPLICATIONS

THIS APPLICATION IS A CONTINUATION IN PART OF application Ser. No. 12/927,766, FILED Nov. 23, 2010.

STATEMENT REGARDING FEDERALLY SPONSORED RESEARCH OR DEVELOPMENT

NOT APPLICABLE

BACKGROUND OF THE INVENTION

1. Field of the Invention

This invention pertains to doors, and, more particularly, to hollow core doors having internal openings through which air flows for preventing air pressure from building up in closed rooms.

2. Description of the Prior Art

Hollow core doors have been made for many years for inside doors. The hollow core doors are less expensive than solid core doors, are easier to manufacture, and they are rigid and hence resist warping and twisting. Such hollow core doors make up the largest share of inside doors where strength and security are not required.

A hollow core door generally includes a perimeter frame of a pair of vertically extending stiles and a pair of horizontally extending rails. The perimeter frame is covered typically with plywood panels adhesively secured to the perimeter frame. There are also inside frame elements, typically wood strips extending horizontally between vertical frame members or in an "x" configuration within the perimeter frame.

With the advent of cheaper materials, such as hardboard and medium density fiberboard (mdf) to replace the plywood, the construction of doors became less expensive using the cheaper materials than the manufacture of doors using the more expensive plywood panels or covers or skins. However, the use of hardboard and mdf also requires a binder, and the most commonly used binder is a urea formaldehyde resin or compound. In other words, the substances out of which panels for hollow core doors are made inherently include, under contemporary manufacturing processes, at least a single noxious material.

The use of urea formaldehyde contributes to what is sometimes referred to as "Sick Building Syndrome." This syndrome is caused by the gas emissions from the formaldehyde and from other chemicals used in the new door products and from other products in the home that also use formaldehyde resin or binder, such as furniture, kitchen cabinets, wood flooring, counter tops, wallpaper, carpet, and even paint.

There may also be other factors contributing to the Sick Building Syndrome, such as poor ventilation, combustion gases, fumes from attached garages, high auto traffic, tobacco smoke, and various volatile organic chemicals or VOCs. However, formaldehyde compounds or products probably contribute most to the Sick Building Syndrome and to the discomfort of people in the building or structure.

One solution, or partial solution, to the syndrome is to reduce the use of formaldehyde products. Another solution is to provide a product or products that absorbs and decomposes the formaldehyde gases and other noxious gases or products. The present invention includes absorbent material which absorbs and decomposes formaldehyde gases and other noxious materials and removes them from within the hollow core door and from air passing through the hollow core of a door to help clean the air within the room and building in which the door is located.

Moreover, the use of several doors in a house or building, such as one or more doors in each room, provides sufficient area on which is disposed the absorbent material for cleaning or scrubbing the air flowing through the doors. It is noted that typically each room in a house has at least one door, and rooms may have more than one door when closet doors, etc., are taken into consideration. The more doors in a home or building, the more efficient the scrubbing or cleaning process becomes.

It is also noted that in the case of new construction, doors are usually installed towards the end of the construction period, but prior to occupancy. It is important to clean the air of all the noxious material occasioned by the construction, such as paints, adhesives, smoking, new furniture, etc., prior to occupancy. The use of fans to change the air after construction and prior to occupancy may remove much of the noxious materials, but VOCs and adhesive gases may continue to outflow from their sources for a substantial period of time after construction and after occupancy. The present invention helps to remove those noxious materials from the air on a continuing, long term basis.

Hollow core doors also have an advantage in that the hollow core is ideal for including pressure equalization elements to prevent air pressure from building up within a closed room. Such air pressure build up in a room interferes with the proper circulation of heated or cooled air in a forced air system.

Typically, there are no cost effective ways to prevent the increase in pressure in a closed room relative to a return air space. The return air space in a house is usually a hall which has a return air duct which conveys return air back to an air handler.

Several embodiments of hollow core doors of the present invention overcome the problem of preventing pressure build up in a room and at the same time provide substantial privacy relative to both light and sound. Moreover, the air scrubbing and pressure build up structures may be combined to provide a "smart door" That performs both a scrubbing function and a pressure build up prevention function.

SUMMARY

The invention described and claimed herein includes an interior door with a core having openings through which air passes between a room and a return air area for equalizing the pressure in the room and in the return air area. Panels on either side of the core are spaced apart from the core such that flow of air through the core of the door is at least equal to the area of an inflow vent so that there is no build up of pressure in the room. An intake air panel and an outflow air panel are dimensioned to provide the required air flow through the door from the room to the return air space. The dimensions of the spacing of the two panels from the core and openings in the core provide the requisite air flow to prevent pressure build up in the room. The inner and outer panels, together with the core and the openings therein also provide privacy for both visual and sound between the room and the return air space. The return air space is typically a hall or the like which includes an air return path to the air handler for the house or structure.

Among the objects of the present invention are the following:

To provide a new and useful hollow core door;

To provide a new and useful hollow core door having passages through the door for the flow of air between the room in which the door is installed and a return air area for the flow of air through the door;

To provide a new and useful hollow core door having air flow through the door of a predetermined amount equal to or greater than the air flow into the room from an air supply register to prevent the build up of pressure within a closed room;

To provide a new and useful hollow core door having a center panel within the door with a plurality of openings in the center panel for the flow of air;

To provide a new and useful hollow core door having a pair of panels spaced apart from a center panel within the door and around which air flows;

To provide a hollow core door having panels spaced apart from a center panel which includes openings the area of which provides a predetermined area for controlling the flow of air through the door;

To provide a new and useful hollow core door for preventing a build up of pressure in a room by air flowing non-linearly through the door;

To provide a new and useful hollow core door apparatus for preventing a build up of pressure in a room having a forced air system by flowing air through a door to a return air space;

To provide new and useful door apparatus combining an air flow through the door for removing noxious materials from the air flow and for preventing a pressure build up in a room by flowing air generally non-linearly through the door to a return air space; and To provide new and useful apparatus for preventing a build up of pressure in a room having a forced air system.

BRIEF DESCRIPTION OF THE DRAWING

FIG. 1 is a schematic representation of a door of the present invention in its use environment.

FIG. 2 is a perspective view of a portion of the door of FIG. 1 partially broken away, taken generally from circle 2 of FIG. 1.

FIG. 13 is a fragmentary view of a portion of a door comprising another alternate embodiment of the present invention.

DESCRIPTION OF THE PREFERRED EMBODIMENT

Figure 3:
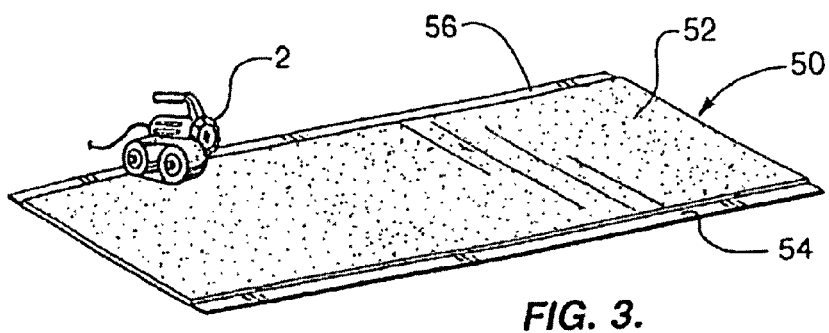
FIGS. 3, 4, and 5 are perspective views sequentially illustrating the manufacture of a door of the present invention.

FIG. 1 is a schematic representation of a view of a hollow core door 10 of the present invention disposed in a room 3. The room 3 is the use environment of the door 10. The door 10 includes a top panel 12 (see FIG. 2) secured to a perimeter frame Elements of the perimeter frame and portions of internal elements are shown in FIG. 2. FIG. 2 comprises a perspective view of a portion of the door 10 of FIG. 1, taken generally from circle 2 of FIG. 1. A portion of a side stile 12 is shown, along with a portion of a top rail 16, and a top cover or panel 40. The top rail 16 includes a plurality of openings or holes 18 through which air flows vertically within the door 10. Also shown in FIG. 2 is a portion of an upper internal brace element 24. The element 24 includes a plurality of spaced apart holes or openings 26 through which air may flow.

Figure 4:
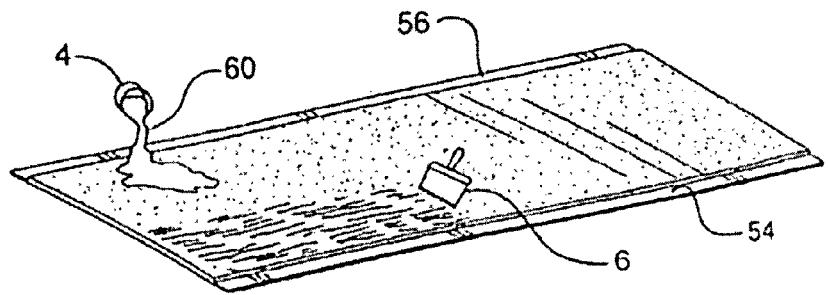
Figure 5:
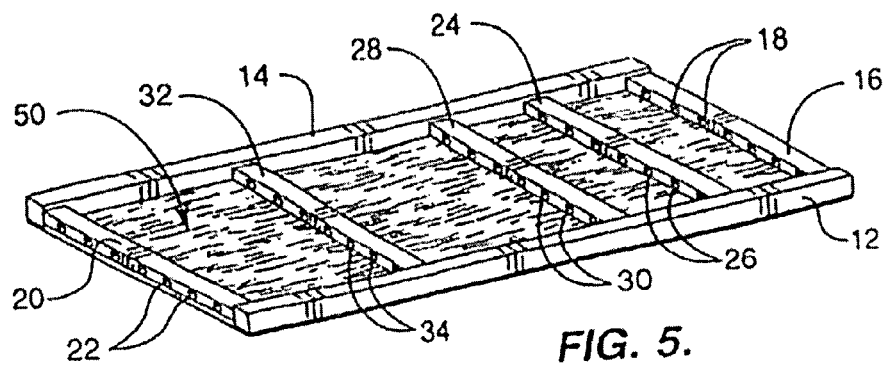
Figure 6:
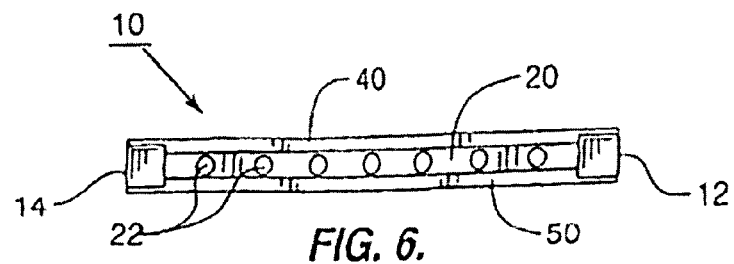
FIG. 6 is an end view of a door of the present invention.

The door 10 and a method of making the door is illustrated in FIGS. 3, 4, and 5. FIGS. 3, 4, and 5 are consecutive or sequential perspective views illustrating the steps used to make the door 10. FIG. 5 also illustrates the internal bracing of the door 10. FIG. 6 is an end view of the completed door 10. For the following discussion, reference will be primarily directed to FIGS. 3, 4, 5, and 6.

A central portion 52 of an outer door panel or skin 50 may be rough sanded by a belt sander 2 after parallel rabbets 54 and 56 are machined into the panel 50. Obviously, an automatic sanding machine, not shown, may be preferable to the hand operated belt sander 2 shown in FIG. 3 if such sanding is deemed desirable. The purpose of the sanding is to acquire better adhesion of the absorbent material to the panels of the door. Other methods may also be used, such as paint or other adhesive.

The stiles 12 and 14 extend into the rabbets 54 and 56, as best shown in FIG. 6, when the outer panels are ready to be secured to the perimeter frame and to any internal frame elements.

After the rough sanding or sealing of the panel, an absorbent, such as diatomaceous earth, is applied to the rough sanded portion 52 of the panel 50. In FIG. 4, the absorbent material is schematically represented by reference numeral 60 being applied from a can or cup 4 or other desired element to form a layer on the sanded portion 52 of the panel 50.

It will also be noted that paper impregnated with an absorbent material may also be adhesively secured to the panel portion 52. Paper strips are sometimes adhesively secured to the inside portions of the outer panels or skins to provide stiffness. The strips may be impregnated with an absorbent, as noted.

The layer 60 is a special absorbent material which also may include an appropriate binder to secure the adhesion of the absorbent material to the panel 50. A water based paint may be used if desired. A scraper or trowel 6 is shown in FIG. 4 as smoothing the layer of absorbent material 60 on the panel 50 to insure an even coating on the panel.

It will be noted that any appropriate method of applying the absorbent material may be used. For example, rollering, spraying, troweling, etc., may be desired under various circumstances, such as when automating the process, or when a particular type of absorbent material used, etc.

Absorbent materials, such as diatomaceous earth and other materials which may also contribute to the absorption and decomposition of formaldehyde and noxious material may be includes in the absorbent material layer 60. A benefit of using diatomaceous earth, in addition to its absorbent capability, is the destruction of noxious insects. It is well known that insects which eat diatomaceous earth die of dehydration. Thus, the absorbent material layer 60 provides a pest control service, in addition to the absorption and decomposition of formaldehyde gases and tobacco smoke ingredients, and other noxious gases.

Other materials such as gypsum, sodium sulfate, manganese dioxide, aluminum oxide, titanium dioxide, potassium permanganate, tourmaline, various types of carbon or charcoal, and other materials currently being used or being developed, may also be included or used as or in the absorbent material layer 60.

Furthermore, the use of nano scale materials may also be used to scrub noxious materials, such as volatile organic chemicals (VOCs), from air. Nano scale materials, such as the tourmaline referred to in the preceding paragraph, are being developed for scrubbing noxious materials from air, but at the present time the use of such technology is in it infancy. In the future, such materials may be advantageous for use with the structure set forth herein.

The steps illustrated in FIGS. 3 and 4 are accomplished on the inner surfaces of both panels 40 and 50. Sequentially, after both panels have received the absorbent or scrubber material, the panels are secured to the perimeter frame and to the internal bracing or core. For example, in FIG. 5 the bottom panel 50 is shown secured to the stiles 12 and 14 and to the rails 16 and 20. Both rails 16 and 20 include the holes or apertures 18 and 22, respectively. Internal horizontal bracing or core elements 24, 28, and 32 are secured to the panel 50 and to the stiles 12 and 14. The elements 24, 28, and 32 each have a plurality of holes or apertures 26, 30, and 34, respectively, to allow for the flow or air continuing through the core of the door 10.

FIG. 6, an end view of the door 10, shows the stiles 12 and 14 and the bottom rail 20 with is apertures 22, and the panels 40 and 50. Note that the panels 40 and 50 have been arbitrarily been designated "top" and "bottom" for convenience. The "top" panel 40 is also designated as the "front" panel, above.

The steps illustrated in FIGS. 3 and 4 are repeated for the top panel 40, and the panel 40 is then secured to the perimeter frame and to the core elements.

Figure 7:
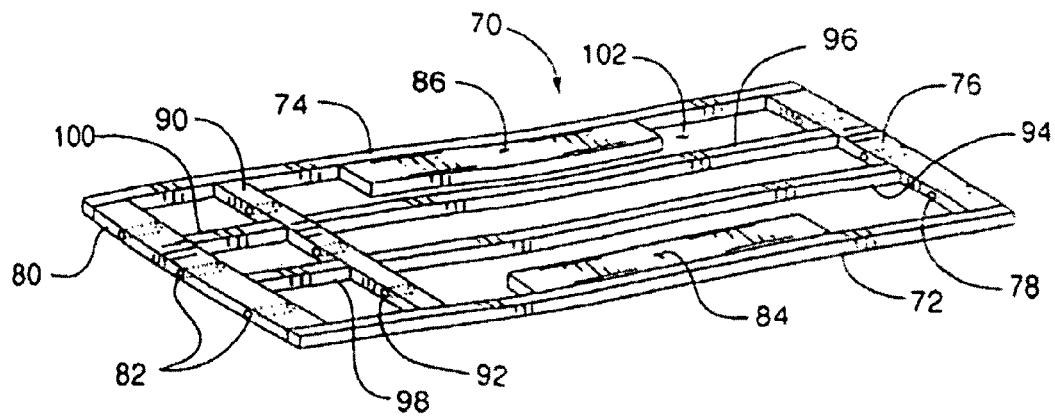
FIGS. 7 and 8 are perspective views of alternate embodiments of a portion of a door of the present invention illustrating cores.

FIG. 7 is a perspective view of a portion of an alternate embodiment of the present invention, comprising hollow core door 70. The door 70 includes a pair of spaced apart stiles 72 and 74 and a pair of rails 76 and 80 secured to the stiles.

The rail 76 is a top rail, and it includes a plurality of spaced apart holes 78 through which air flows. The rail 80 is a bottom rail, and it includes a plurality of spaced apart holes 82 through which air flows.

A lower horizontal cross brace 90 is spaced apart upwardly from the rail 80. The cross brace 90 includes a plurality of holes or openings 92 through which air flows. The holes 82, 92, and 78 are preferably aligned with each other to facilitate the air flow. However, the holes need not be aligned. Air will flow through the core of the door 70 generally regardless of the orientation or alignment of the various holes in the horizontally extending elements.

A pair of lock blocks 84 and 86 are secured respectively to the stiles 72 and 74. The pair of lock blocks 84 and 86 insure that the door 70 may be hung for either right handed or left handed movement.

Note that lock blocks, secured to the stiles, are not shown in most of the figures of the drawing herein. Such lock blocks are well known and understood in the door industry and have been omitted for convenience and clarity of illustration.

A pair of vertically extending brace elements 94 and 96 extend between the horizontal brace 90 and the top rail 76 and are appropriately secured thereto. Since the vertical elements 94 and 96 do not interfere with the flow of air through the core of the door 70, no holes need be drilled through them. A second pair of vertical elements 98 and 100 extend between the brace 90 and the bottom rail 80.

A panel 102 is appropriately secured to the stiles, the rails, the internal brace elements, and the lock blocks.

Figure 8:
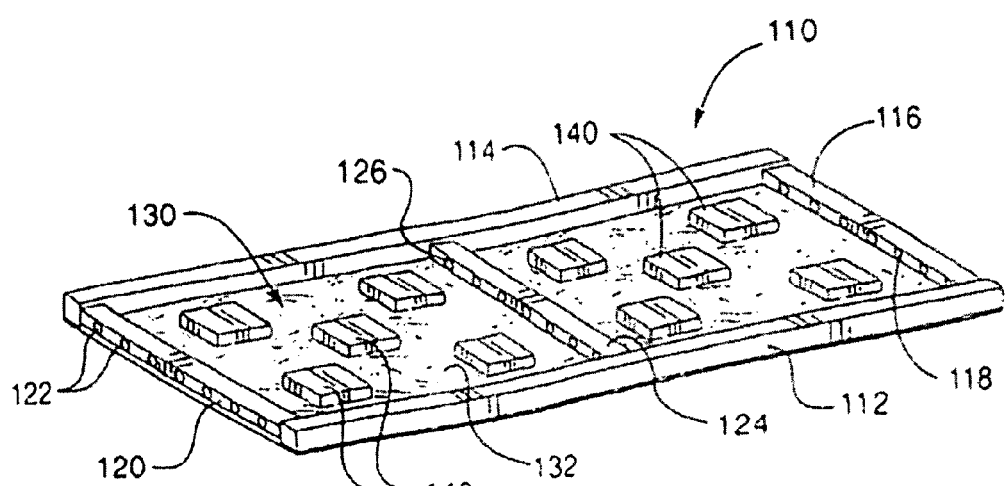

FIG. 8 is a perspective view of another alternate embodiment of a portion of a door 110 of the present invention.

The door 110 includes a pair of stiles 112 and 114 and a pair of rails 116 and 120. The top rail 116 includes a plurality of spaced apart holes 118 through which air flows. The bottom rail 120 includes a plurality of spaced apart holes 122. The stiles and rails are appropriately secured together, as are the stiles and rails in the previously discussed embodiments.

Within the door frame of the stiles and rails is a horizontal brace 124. The brace 124 includes a plurality of holes or openings 126. A bottom panel 130 is appropriately secured to the frame elements, including the stiles, the rails, and the brace 124. An absorbent layer 132 is in turn secured to the panel 130.

Secured to the panel 130 are spacer blocks 140. The blocks 140 are disposed both above and below the horizontal brace 124. The blocks 140 are spaced apart so as not to impede the flow of air through the core of the door 110. A top panel, not shown, is in turn secured to the blocks and to the frame members 112, 114, 116, 120, and 124, and to the internal brace blocks 140. The internal blocks and the brace element 124 provide internal strength for the door. Note that lock blocks are not shown for the door 110. Such blocks are, of course, required.

Figure 9:
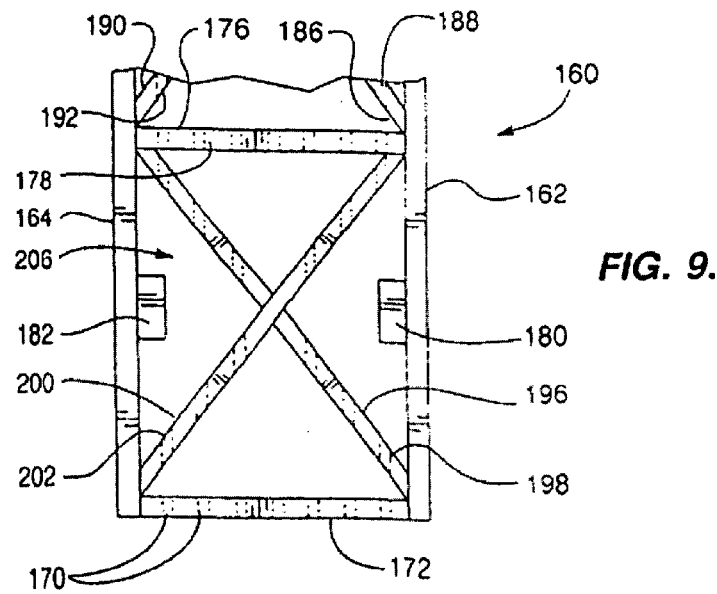
FIGS. 9 and 10 are plan views of more alternate embodiments of a portion of a door or the present invention illustrating core elements.

FIG. 9 is a partial plan view of a hollow core door 160, which is another alternate embodiment of the present invention. The door 160 includes a pair of stiles 162 and 164, and a pair of rails of which only a bottom rail 170 is shown. The rail 170 includes a plurality of holes 172 extending through the rail for the flow of air within the door 160.

The internal bracing for the door 160 includes a horizontal brace 176 extending between and secured to the stiles 162 and 164. The brace 176 includes a plurality of holes 178 through which the air flows.

The internal bracing also includes two pair of x members, an upper pair 186 and 190, and a lower pair 196 and 200. The member 186 includes a plurality of holes 188 and the member 190 includes a plurality of holes or openings 192. The lower members 196 and 200 include holes 198 and 202, respectively. Thus, air flows through the holes 172 in the rail 170, through the holes 198 and 202 in the x members 196 and 200, respectively, through the holes 178 in the horizontal brace 176, through the holes 188 and 192 in the upper x members 186 and 190, respectively, and through holes in the upper rail, not shown.

Secured to the frame of the door 160 is a bottom panel 206. An appropriate absorbent material, such as diatomaceous earth in an appropriate binder, is secured to the panel 206 and to a top panel, not shown. As the air flows through the hollow core of the door 160, through the various holes, past the absorbent material on both the bottom panel 206 and the top panel, formaldehyde compounds and other noxious gases or materials are filtered out.

Figure 10:
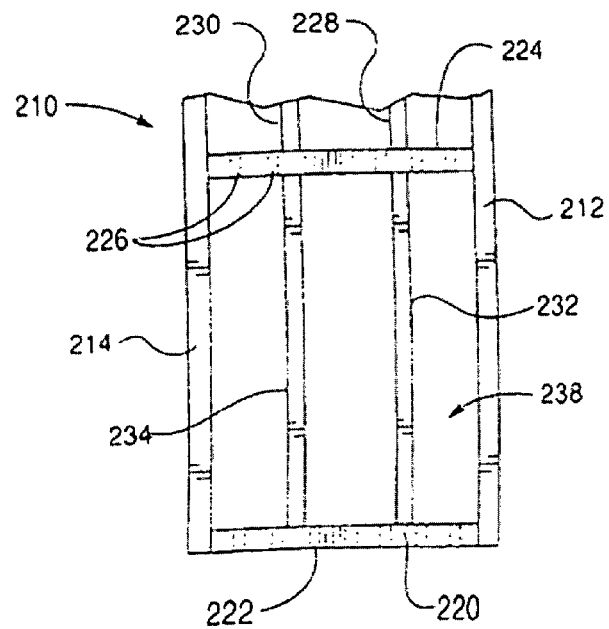

FIG. 10 is a plan view, partially broken away, of another alternate embodiment of a frame and core structure of a door 210. The door 210 includes a pair of stiles 212 and 214 and a pair of rails, of which only a lower rail 220 is shown. The rail 220 includes a plurality of holes or openings 222 extending through the rail for the flow of air. The stiles 212 and 214 and the rails are appropriately secured together and define the perimeter frame for the door 210.

A horizontal brace 224 extends between and is secured to the stiles 212 and 214. A plurality of holes 226 extend through the brace 224 for the flow of air. Above the brace 224 are a pair of vertically extending braces 228 and 230. The braces 228 and 230 extend between and are secured to the upper rail, not shown, and the brace 224. A similar pair of vertically extending braces 232 and 234 extend between and are secured to the bottom rail 220 and the horizontal brace 224.

A bottom panel 238 is secured to the various members, including the perimeter frame 212, 214, 220 and the upper rail, not shown, and to the internal brace or core elements, including the horizontal brace 224 and the vertical elements 228, 230, 232, and 234. The panel includes an appropriate absorbent material secured thereto. An upper panel, not shown, completes the door 210, along with appropriate lock blocks, also not shown.

Figure 11:
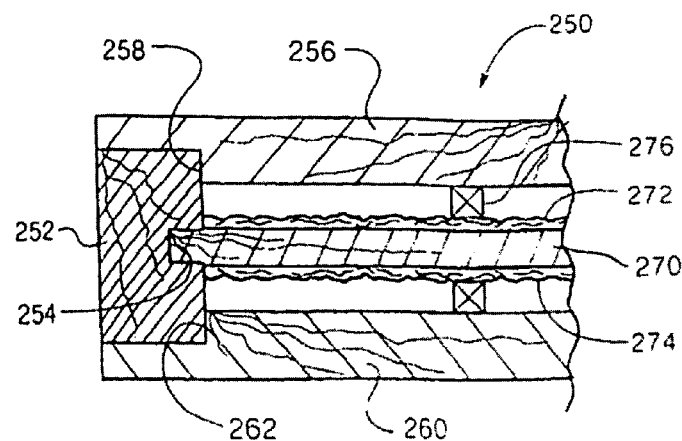
FIG. 11 is a view in partial section of a portion of another alternate embodiment of the present invention.

FIG. 11 is a view in partial section of a portion of a door 250 which includes a full length inner panel 270 with absorbent coatings 272 an 274 on both sides. The panel 270 comprises a single core element. The door 250 includes a stile 252 with a dado groove 254 which receives the panel 270. The door 250 also includes two outer panels 256 and 260. The panels 256 and 260 includes rabbets 258 and 262 into which the stile 252 extends.

A pair of spacers 276 help to center the panel 270 between the outer door panels 256 and 260. The spacers 276 are aligned with each other for proper support, and additional pairs (not shown) are spaced apart as appropriate between stiles.

It will be noted that the inside of the panels 256 and 260 may also be coated, as discussed above for the doors 10, 70, 110, 160, and 210. Using four such surfaces for the absorbent material provides nearly seventy five square feet of absorption area.

The panels 256 and 260 may be mdf or other appropriate material, as desired.

Figure 12:
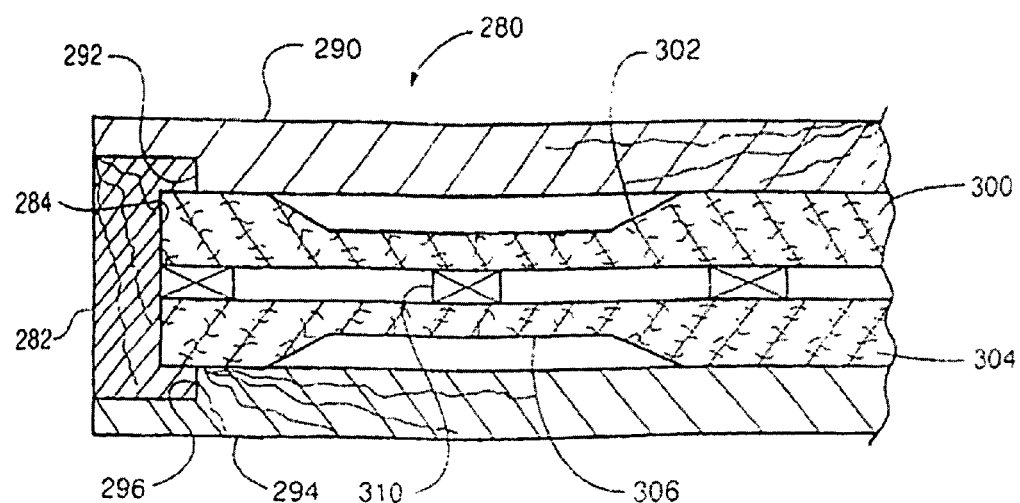
FIG. 12 is a view in partial section of a portion of another alternate embodiment of the present invention.

FIG. 12 is a view in partial section of a portion of a door 280 which includes two outer panels 290 and 294 and two absorbent inner panels 300 and 304 as part of the core elements. The door 280 includes a stile 282 which extends into rabbets 292 and 296 in the outer panels 290 and 294, respectively, and a relatively large dado groove 284 into which extend the panels 300 and 304. A plurality of spacers 310 hold the panels 300 and 304 apart within the door 280. The spacers 310 are spaced apart between stiles as needed for supporting and spacing the panels 300 and 304. Note that the first spacer 310 extends into the dado groove 284 between the outer ends of the panels 300 and 304.

The panel 300 includes a recess 302 and the panel 304 includes a recess 306. The recesses 302 and 306 increase the surface of the panels 300 and 304, respectively for absorption purposes.

The panels 300 and 304 may be gypsum, without the paper or cardboard covers which wall board (gypsum board) has, and that have had materials discussed above added to them for scrubbing. The panels 300 and 304 may also be a pair of panels such as the panel 270 of FIG. 11. However, gypsum has qualities which lend credence to its use as singular panels.

A special quality of gypsum, in addition to is general absorbency capabilities, is that it absorbs moisture from the air when there is high humidity and releases the moisture when the humidity is low. The use of gypsum accordingly decreases mildew and mold growth in a structure, in addition to increasing the comfort level in the structure.

Another property or quality of gypsum is that it helps to absorb sound. Thus, the use of a door 280 with a pair of gypsum panels reduces the sound level in a structure in which such a door/doors is/are installed.

Another property or quality of gypsum is its fire retardant ability. The doors with the gypsum panels thus provide fire protection within a structure not otherwise contemplated by prior art hollow core doors.

As an alternative to two gypsum panels within a door, a single gypsum panel, such as the panel 300, may be paired with a panel such as the coated panel 270 of the door 250. Such door combination provides a mixture of the capabilities or qualities or advantages of the various absorbents.

Note that the panels 270, 300, and 304 comprise core bracing elements in addition to their absorption functions. The spacer elements used in conjunction with the inner panels also contribute to core bracing for their doors.

Referring again primarily to FIGS. 2, 5, and 6, the top and bottom rails show openings or holes 18 and 22, respectively. If only formaldehyde gases or other noxious materials within an mdf door or the like were considered, such openings or holes in the rails may be eliminated. With absorbent material, such as diatomaceous earth, within the core, the formaldehyde products would be absorbed and decomposed. Holes or openings may still be located within internal bracing elements, if desired. However, the internal bracing elements may also be without holes if the internal absorbent is located similarly to that shown in FIG. 5. Obviously, the location and quantity of the absorbent material will be as appropriate for a particular door.

Moreover, if absorbent and decomposing materials, such as diatomaceous earth and gypsum, etc., are incorporated into the construction of the mdf or similar material, then such materials need not be added to the inside of the panels themselves. Rather, the addition of the scrubbing materials to the mdf or similar material in the making of the panels simplifies the scrubbing situation.

However, the inclusion of the scrubbing materials into the panels may not be sufficient if the filtering or scrubbing of an air flow through a hollow core door is desired. In such case, the addition of scrubbing material or materials within the hollow core as described above is desirable.

While diatomaceous earth and other materials have been mentioned or discussed above as appropriate absorbent materials for formaldehyde and other noxious material in the gases in the air flowing through the hollow core of a door, there are other appropriate absorbent or decomposing materials, such as activated carbon or charcoal, with appropriate additives, and other materials which also may be used for absorbing and decomposing formaldehyde and other noxious gases in the air flowing through the internal core of the hollow doors discussed above. And in the future there will undoubtedly be other materials to perform the same basic scrubbing functions.

Moreover, one panel, a top panel for example, may use one type of absorbent or decomposing material, while the other panel, a bottom panel, may use another type of absorbent or decomposing material. Or several types of such materials may be used on each panel. The use of a particular one or more materials may depend on the particular situations or locations for or at which the doors are made or are installed. The removal of noxious materials from air flowing through the hollow core of a door may include different types of absorbent or decomposing or other products. Noxious material may take the form of compounds, odors, moisture, etc., and combinations of such things.

The removal of such noxious material may require absorption, decomposition, or other technique—chemical, mechanical, etc. The flow of air in a structure and through the hollow core of a door carries the noxious material, and the removal of the noxious material may require a combination of products, techniques, etc.

Another technique may also be used to remove noxious materials, and that technique is to use a photocatalyst, such as titanium dioxide. A photocatalyst, such as titanium dioxide reacts to light, such as ultra violet light, and breaks down into hydroxyl radicals and super oxide anions. The products of the photocatalytic process oxidize noxious materials, such as volatile organic compounds, formaldehyde, and other materials as referred to above, etc.

Ambient light, direct sunlight, or an artificial light source, may be used to provide the necessary light to catalyze the photocatalytic material. The photocatalytic process will continue as long as there is light to cause the photocatalytic to take place.

Accordingly, referring to FIG. 1, the exterior of the door, or the door facings, may be coated with titanium dioxide or other photocatalytic compound. In the presence of light, sunlight or ambient light, the photocatalytic process takes place, removing noxious products.

Referring to FIG. 13, if such photocatalytic coating is placed on the inside of hollow core doors, an artificial light source must be provided in order to cause the photocatalytic process to take place.

FIG. 13 is a schematic representation of a portion of a hollow core door 330 having an artificial light source and associated elements. The door 330 includes a stile 332 and a top rail 336. Extending through the rail 336 are shown two holes or apertures 338 through which air flows from the interior of the door 330. The door 330 also includes a top panel 346 and a rear or back panel 348.

Extending downwardly from the rail 336 is a battery and lamp compartment 360. The compartment 360 includes a top cover 362. Extending outwardly from the compartment 360 is a lamp 364. Replacement of the battery or batteries for providing current for the lamp 364 is by way of the cover 362. The cover 362 is flush with, or slightly recessed below, the top of the rail 336.

Within the door 330, either on the inside of the panels 346 and 348 is photocatalytic material, and the lamp 364 provides the appropriate light, such as uv light, to initiate the photocatalytic process. If desired, there may be additional light sources secured within the hollow core, in compartments such as 360, and attached to the rails or stiles, as appropriate or as desired.

If the airflow through the door 330 by normal convective processes is deemed insufficient, a relatively small fan may be incorporated into the door. Referring again to FIG. 13, a fan 366 may be substituted for the lamp 364 for moving the air. In such case, the fan 366 may be disposed at the top of the door 330, as shown, or it may be disposed at the bottom of the door to achieve the air flow.

It will be noted that the term "gases" is to be broadly construed and includes water vapor or moisture in the air, as well as odoriferous gases, and other noxious materials or compounds in the air within a structure. The term "gases" is thus not limited to formaldehyde or similar gases.

It will also be noted that doors made out of mdf products have been discussed and illustrated because of the use of formaldehyde resin or binders commonly used in the manufacture of mdf products, and formaldehyde is probably the leading noxious material. However, a hollow core door made of steel, fiberglass, wood, or other products, may also be used with absorbent, decomposing, etc., material within the hollow core for removing or neutralizing noxious material or products or gases from air flowing through the hollow core. The scrubbing of noxious material from air flow accordingly may require a combination of materials secured within the hollow core of a door regardless of what the door is made of.

The terms "scrubber," "scrubbers," and "scrubbing," all refer generically to the various kinds or types of material which may be used to remove noxious materials from the internal air flow within the core of a door.

It will further be noted that as used herein, and in the following claims, the terms "material" and "materials" are virtually interchangeable, with "material" being considered both, or either, singular or plural.

The terms "absorb" and "absorbent," etc., have been used herein regarding appropriate materials for carrying out the purposes of the present invention. It will be understood that "adsorb" and "adsorbent" materials may also be used to carry out the purposes of the present invention. Essentially, for purposes herein, the terms are interchangeable. Moreover, it will be understood that a combination of absorbent and adsorbent materials may be used if desired in the cleaning or filtering of the air flow through the hollow core doors of the present invention.

It will be still further noted that openings may be provided in the top and bottom structural elements of a door, and in structural or other elements within the door without regard to the material out of which the door is made. The terms "rails" and "stiles" refer broadly and respectively to the top and bottom horizontal and to side vertical elements of a door perimeter frame without regard to the material out of which the door is made.

Moreover, the size of the openings or holes in the rails and in the internal core elements may vary from relatively small to rather large, depending on the desired air flow and on the absorption material within the core of the door.

Finally, it will be understood that airflow through a door may vary, depending on the time of day, the relative humidity, the size of the openings in the rails and in other interior door elements, and other factors. For example, morning air it typically more humid, and the more humid air flowing through a door core may be more readily absorbed into the filtering materials than drier air. As the relative humidity decreases during the day, the drier air minus the contaminants or noxious materials is desorbed from the filtering material and flows out of the door. Contaminants, or noxious material, in the airflow through the door may still be removed from the airflow regardless of the relative humidity of the air. Furthermore, humidity itself may be absorbed by various materials.

The changes in the humidity during the day perhaps allow the removal process to be more efficient. However, air flowing through the door will be cleansed by the scrubbing material disposed within the core of the door by normal convection regardless of the humidity. The flowing air is cleansed of contaminants and noxious material from both the room and the door core internal elements, as stated above.

In addition to the removal of noxious material from an air flow through hollow core door, a hollow core door may be used to prevent the build up of air pressure in a closed room which has a forced air system. Embodiments of such hollow core door apparatus are illustrated in drawing FIGS. 14-22 and are discussed below.

Figure 14:
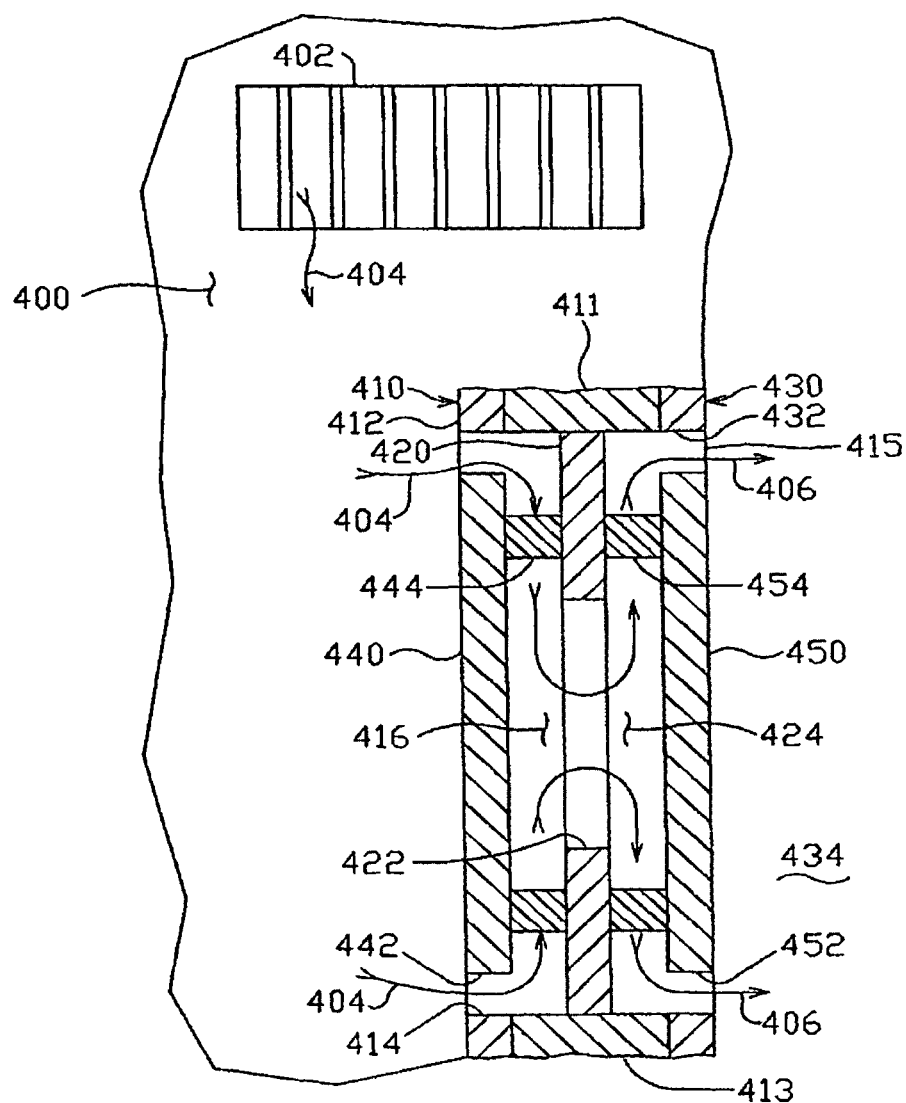
FIG. 14 is a fragmentary view in partial section through another alternate door of the present invention.

FIG. 14 is a schematic view in partial section of a portion of a door 410 illustrating the concept of the present invention in an embodiment for preventing the build up of air pressure from a flow of air 404 flowing from a register 402 in a closed room 404.

Figure 15:
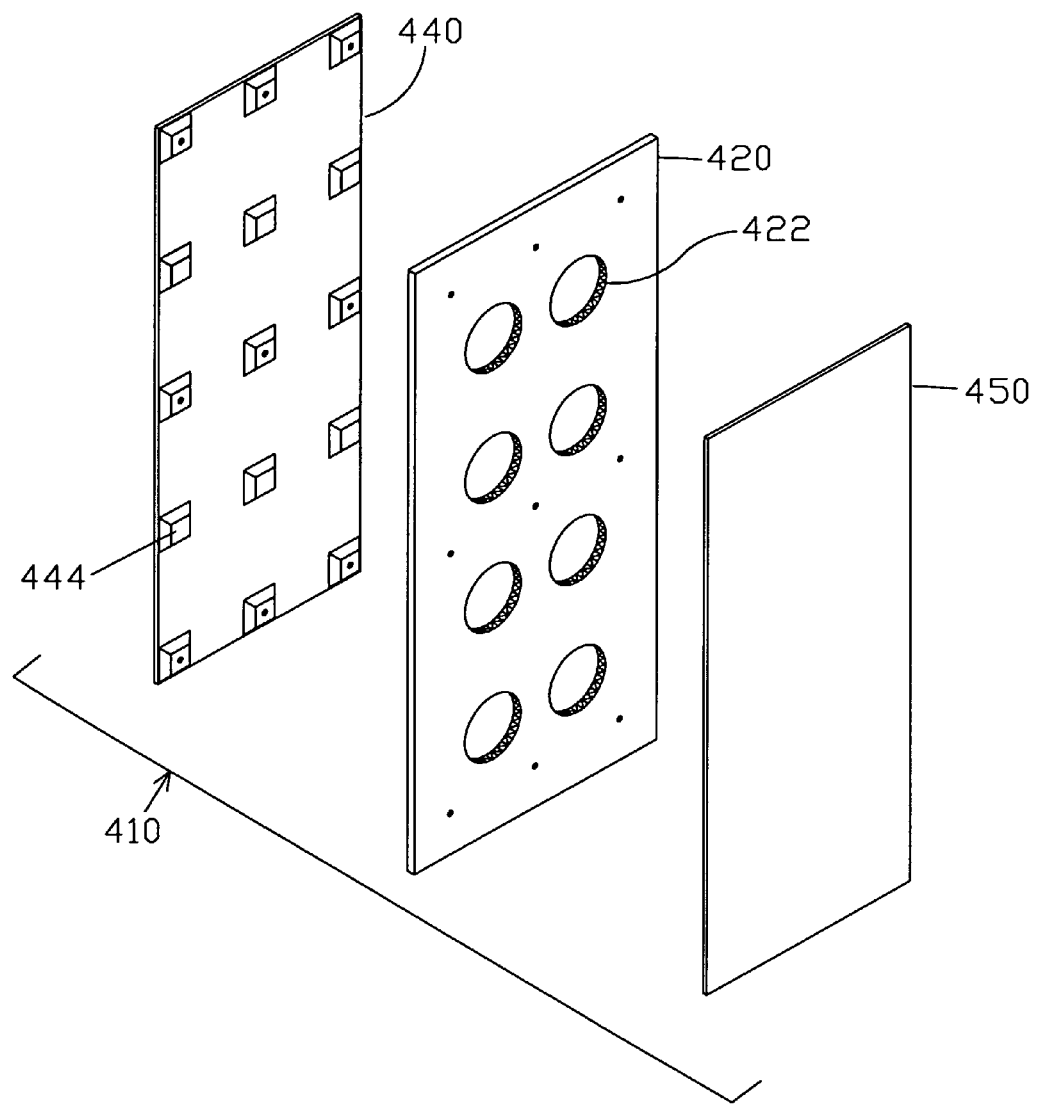
FIG. 15 is an exploded perspective view of the door of FIG. 14.

FIG. 15 is an exploded perspective view of a portion of the apparatus of FIG. 14. For the following discussion, reference may be made to both FIGS. 14 and 15.

The register 402 provides a flow of air 404 into the closed room 400. The air flow into the room 400 is measured in cubic feet per minute (CFM). To prevent a build up of pressure in the room 400, the flow of air through the door 410 to a return air space 434 outside the room 400 should be proportional to the CFM flow of the inflow air 404. This will be discussed in more detail below on conjunction with the structure of the door 410.

It will be noted that in the following paragraphs the terms "inside" and "outside" refer to the room 400. The "inside" thus refers to the inside of the room 400 and the "outside" refers to the outside of the room, or the side of the door 410 which faces outwardly of the room and is in contact with the return air space 434.

The door 410 includes an inside door panel or skin 412, comparable to the panel 50 as may be best understood from FIGS. 3-6. The panel 412 is appropriately secured to a top rail 411 and to a horizontal bracing element 413. The top rail 411 is comparable to the top rail 16 of FIG. 5, and the element 413 is broadly comparable to the bracing element 28 of FIG. 5. A single stile 415 is shown in FIG. 14. The construction of the door 410 is typical of hollow core doors other than the air flow refinements of the air flow elements. Extending through the inside door skin 412 is an opening 414. The opening 414 may be rectangular, or circular, etc. In the opening 414 is an inner panel 440. The configuration of the panel 440 is generally the same as that of the opening 414. The air flow 404 from the register 402 flows through the opening 414 and about the inner panel 440 and into an intake air space 416.

The door 410 also includes an outside door panel or skin 430, comparable to the panel 40, as may best be understood from FIGS. 2 and 6. The door panel or skin (generally "skin" or "skins" hereafter) 430 includes an opening 432 which is generally parallel to the opening 414 and is substantially the same size as the opening 414. Disposed in the opening 432 is an outer panel 540. The outer panel 450 is generally parallel to the inner panel 440 and is substantially the same size.

Between the door skins 412 and 430 is a center panel 420. The center panel 420 includes a plurality of openings 422. Adjacent to the openings 422 on the opposite side of the center panel 420 and between the center panel 420 and the outer panel 440 is an outflow space 424. The outflow space 424 is generally parallel to the intake space 416 and is substantially the same size.

The inner panel 440 includes an outer periphery or rim 442, and the outer panel 540 includes an outer periphery or rim 452. Between the panel 440 and the center panel 420 is a plurality of spacers 444. Between the outer panel 450 and the center panel 420 is a plurality of spacers 454. The spacers 444 and 454 secure the panels 440 and 450, respectively, to opposite sides of the center panel 420, and appropriately space the center panel 420 from the inner and outer panels to define the size of the intake space 416 and the size of the outflow space 424. The spaces 416 and 424 have the same area.

It will be noted that the spacers 444 and 454 are shown in FIG. 14a being rectangular or circular in configuration, and in FIG. 15 as being truncated pyramidal in configuration. The configuration of the spacers is immaterial; they may be of any desired or convenient configuration.

It will be noted that there are two peripheral spaces shown in FIG. 14. There is a first or inside peripheral space between the opening 414 and the rim or outer periphery 442 of the inner panel 440, and through which the air flow 404 flows into the space 416. There is a second, or outer peripheral space between the opening 432 and the rim or outer periphery 452 of the outer panel 450 through which the air flow 406 flows or passes to the return air space 434.

There is a smooth flow of air 404 from the register 402 through the peripheral space about the rim 442 of the the inner panel 440 within the opening 414 into the intake space 416. The air then flows through the opening 422 in the center wall 420 to the outflow space 424 and outwardly through the peripheral space about the rim 452 of the inside panel 450 in the opening 452, and becomes an air outflow 406 to the return air space 434 outside the room 400, thus preventing the build up of air pressure in the room 400.

The peripheral spaces of the inside panel 440 and the outside panel 450 and the size or area of the openings 422 are appropriately dimensioned to provide at least the same or greater area than the peripheral spaces. The air flow 404 thus has no constraints to flowing non-linearly through the door 410 and outwardly from the room 400 into an air return space 434 outside the room 400.

Thus there is no build up of pressure within the room 400. That is, the air flow out of the room 400 through the door 410 is proportional to the CFM of the flow of air through the register 402 into the room 400. The door 410 thus prevents the build up of pressure in the room 400.

The areas through which the air flows must provide an area proportional to the CFM of the inflow of air through the register 402. There is a relationship between the CFM of the inflow 404 and the square inches of the areas through which the air flows. For example, for a 90 CFM inflow 404, there should be an area of about 90 square inches through which the air flows through the peripheral space between the opening 416 and the rim 442 into the space 416, and there should be at least the same 90 square inches in the openings 422 for the flow of air from the space 416 into the space 424. There also should be the same 90 square inches for the air flow 406 through the peripheral space between the opening 432 and the rim 542.

The distances between the outer periphery or rim 442 and the opening 414, and between the outer periphery or rim 452 and the opening 432, are substantially the same. Those distances, and the length of the spacers 444 and 454, are dimensioned so as to provide the same CFM through the door 410 as the CFM through the register 402 of the air flow 404. That is, the spacing between the rim 452 and the opening 432 defines a peripheral space to provide the desired area for the desired air flow, and is thus equal to the peripheral space between the opening 414 and the rim 442 of the panel 440.

The square inches discussed above are the minimum areas for the CFM of the air flow through the register 402 into the room 400 and through the door 410 for the out flow 406 into the receiving space 434 to prevent any increase on the air pressure in the room 400. However, the square inches may be larger if the door permits. On the other hand, depending primarily on the thickness of the door, providing the necessary square inches for the air travel through the door may require additional elements, such as slanted panels into the air spaces 416 and 424. This will be discussed below.

In terms of pressure, professional standards generally consider that the pressure in a closed room should be less than 3 pascals, or about 0.012 inches of a water column. The present invention meets that criterion.

In FIG. 14, the panel 440 is shown disposed in the opening 414, and the panel 450 is shown disposed in the opening 432. However, it will be understood that the panels 440 and 450 will be spaced apart from their respective skins 412 and 430 in or adjacent to the openings 414 and 432, respectively, to provide the necessary peripheral spacing relative to the intake spaces 416 and 424, respectively, to provide the desired air flow.

For example, for a relatively strong air flow, in terms of CFM, and a relatively narrow door, the spacing of the panels may be outwardly from the door skins to provide the required peripheral spacing, or in a relatively weak air flow, and a relatively thick door, the panels may be disposed inwardly from the door skins. Thus, the term "adjacent" may be used to define the relationship between the door skins and their openings and the locations of the panels relative to the openings in the door skins. The term "adjacent" accordingly denotes the positioning of a panel relative to the openings in the skins in, inside, or outside, the openings.

In FIG. 15, a plurality of openings 414 are shown in the center panel 420. The total area of the openings 414 is equal to or greater than the area in square inches as discussed above.

Figure 16:
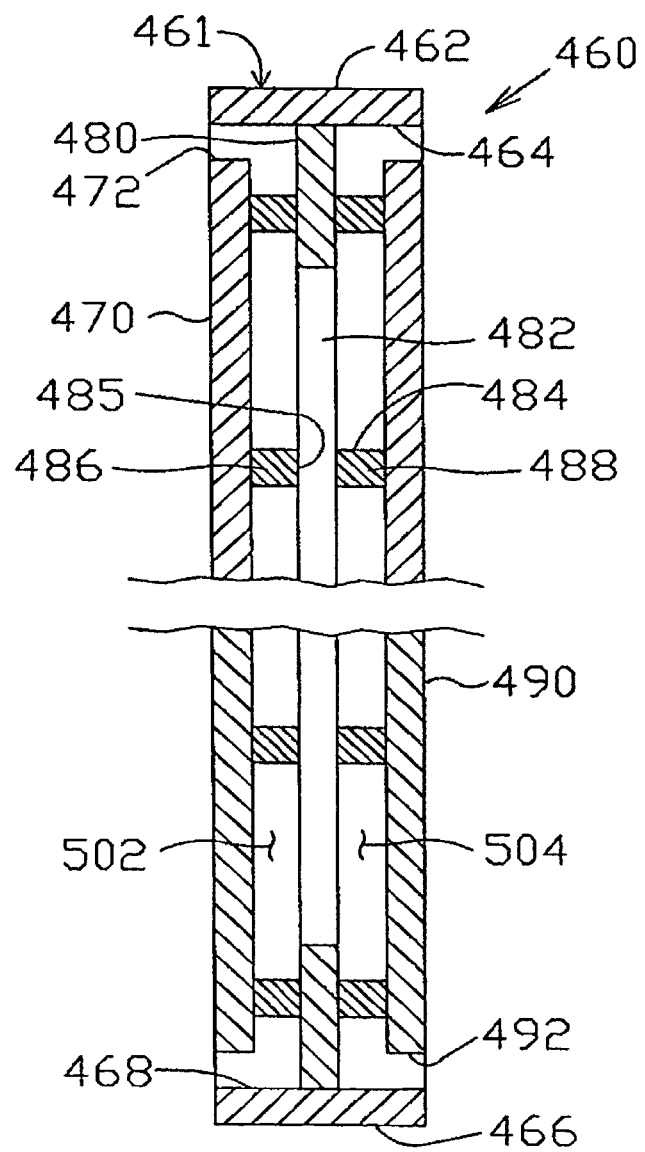
FIG. 16 is a fragmentary view in partial section of an alternate embodiment of the apparatus of FIGS. 14 and 15.
Figure 17:
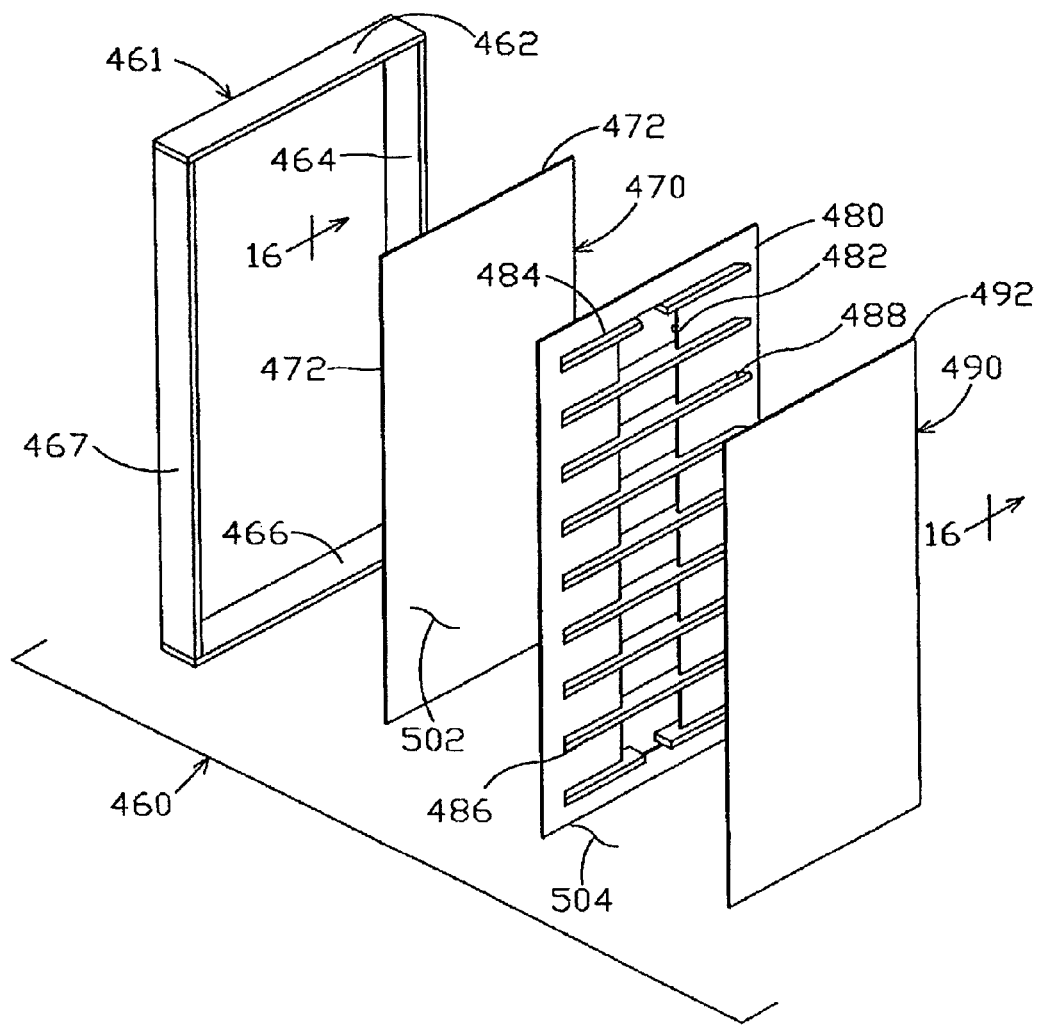
FIG. 17 is an exploded perspective view of the apparatus of FIG. 16

If desired, the apparatus of FIGS. 14 and 15 to prevent pressure build up may be provided as a framed apparatus 460, shown in FIGS. 16 and 17. As may be understood from FIG. 14, the center panel 420 is shown secured to both the inside skin 412 and the outside skin 430 at the top rail 411 and the horizontal brace 413 and adjacent to the peripheral openings 414 and 432 of the respective skins. Thus the top rail 411 and horizontal brace 413 and the skins 412 and 430 and the center panel 420 form a frame. The apparatus 460 utilizes a separate frame which may be secured to inside and outside skins. The framed apparatus 460 is simply inserted into the openings 414 and 432 and eliminates the center panel 420.

FIG. 16 is a view in partial section of a portion of the framed apparatus 460. FIG. 17 is an exploded perspective view of the framed apparatus 460. For the following discussion, reference may be made to both FIGS. 16 and 17.

The framed apparatus 460 includes a frame 461 which includes a top frame member 462, a side frame member 464, a bottom frame member 466, and a side member 467. The frame 461 includes an inner periphery 468. Three panels it inside the frame 461. The three panels include an inner panel 470, a center panel 480, and an outer panel 490. The center panel 480 is appropriately secured to the inner periphery 468 of the frame 461.

The center panel 480 includes an opening 482 and the opening 482 includes opposite side portions which cooperate with spacers 484. A plurality of spacers 484 are secured to the panel 480 and are disposed across the opening 482 to appropriately space the inner panel 470 and the outer panel 490 from the center panel 480. Each spacer 484 includes slots which receive adjacent portions of the panel 480 at the opening 482. The width of the spacers 484 determine the spacing of the panels 470 and 490 from the center panel 480. Each spacer includes bifurcated slots 485 which have two arms 486 and 488 and which define the slots. The opposite side portions of the opening 482 of the center panel 480 are disposed in the slots and against the arms 486 and 488 of the spacers 484, as best shown in FIG. 17.

The inner panel 470 includes an outer periphery 472, and the outer panel 490 includes an outer periphery 492. The space between the inner periphery 468 of the frame 461 and the outer periphery 472 defines the intake area for the flow of air. The intake area is at least as great as or greater than the square inch requirement for the CFM air flow into a closed room, such as the room 400 of FIG. 14, as discussed above.

The space between the inner periphery 468 of the frame 460 and the outer periphery 492 of the outer pane 490 defines the outflow area of the flow of air through the apparatus 460. The outflow area is at least as great as or greater than the square inch intake area, as discussed above.

The panels 470 and 490 are appropriately secured to the spacers 484. The center panel 480 is secured to the center of the frame at the inner rim 468. The inner panel 470 and the outer panel 490 are appropriately dimensioned so as to provide a peripheral space between the inner rim 468 and the outer peripheries 472 and 492, respectively, of the panels 470 and 490 for the required intake and outflow of air, as discussed above.

As best shown in FIG. 16, intake interior space 502 is defined by the inner panel 470 and the center panel 480. An outflow interior space 504 is defined between the center panel 480 and the outer panel 490. The path of the inflow of air through in the peripheral space between the inner panel 470 and the inner periphery 468 of the frame 461 and into the intake air space 502. The air then flows into the outflow air space 504 through the opening 482 in the center panel 480 past the spacers 484. The outflow air then flows from the space 504 and outwardly from the apparatus 460 through the peripheral space between the outer periphery 492 of the outer panel 490 and the inner periphery 468 of the frame 461 to a return air space, such as the space 434 of FIG. 14.

The framed embodiment 460 may be inserted into an opening cut into an existing door, such as in the door 410 of FIG. 14, or in a wall, a transom, etc., as desired and as appropriate.

The panels 440 and 450, and the panels 470 and 490, are smaller than the openings into which they are respectively inserted. The difference in the relative sizes determines the size of the peripheral area through which the incoming air and the outgoing air flows. As clearly stated, the peripheral areas are as large or larger than the proportional square inch area as discussed above.

It will be noted that there is no direct movement of the air through the door 410 or through the frame 460. Rather, the air takes a circuitous, or non-linear, route from the room through the door and the frame to the respective return air spaces, such as the space 434. It follows that sound and light also have no direct path through the door.

Accordingly, privacy is maintained with respect to light and sound when a door is closed. The degree of privacy, with respect to sound is, of course, dependent on the loudness of the originating sound or within a return air space. However, ordinary sounds generally will not pass easily through the door 410 or through the frame 460, thus maintaining the privacy within a room.

Figure 19:
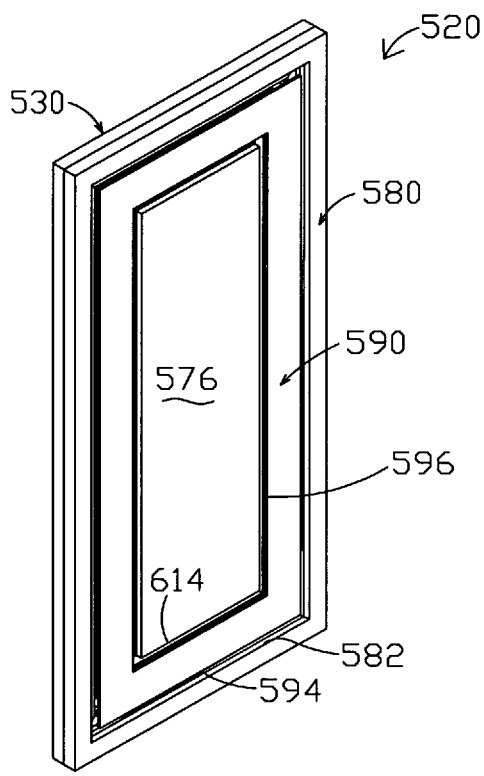
FIG. 19 is a perspective view of the assembled apparatus of FIG. 18.
Figure 20:
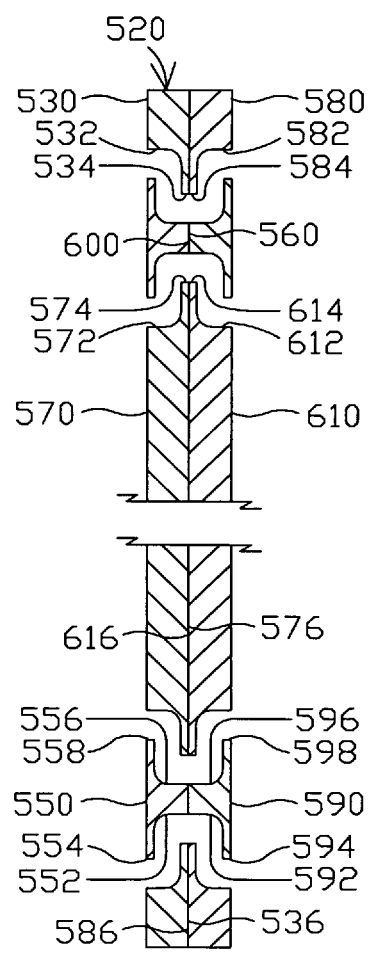
FIG. 20 is a fragmentary view in partial section of the apparatus of FIGS. 18 and 19.

For narrow doors, a modified hollow core door apparatus may be used to prevent the build up of pressure in a closed room. Apparatus for use in a modified hollow core door with non-linear elements for preventing the buildup of air pressure in a closed room is shown in FIGS. 18, 19, and 20.

Figure 18:
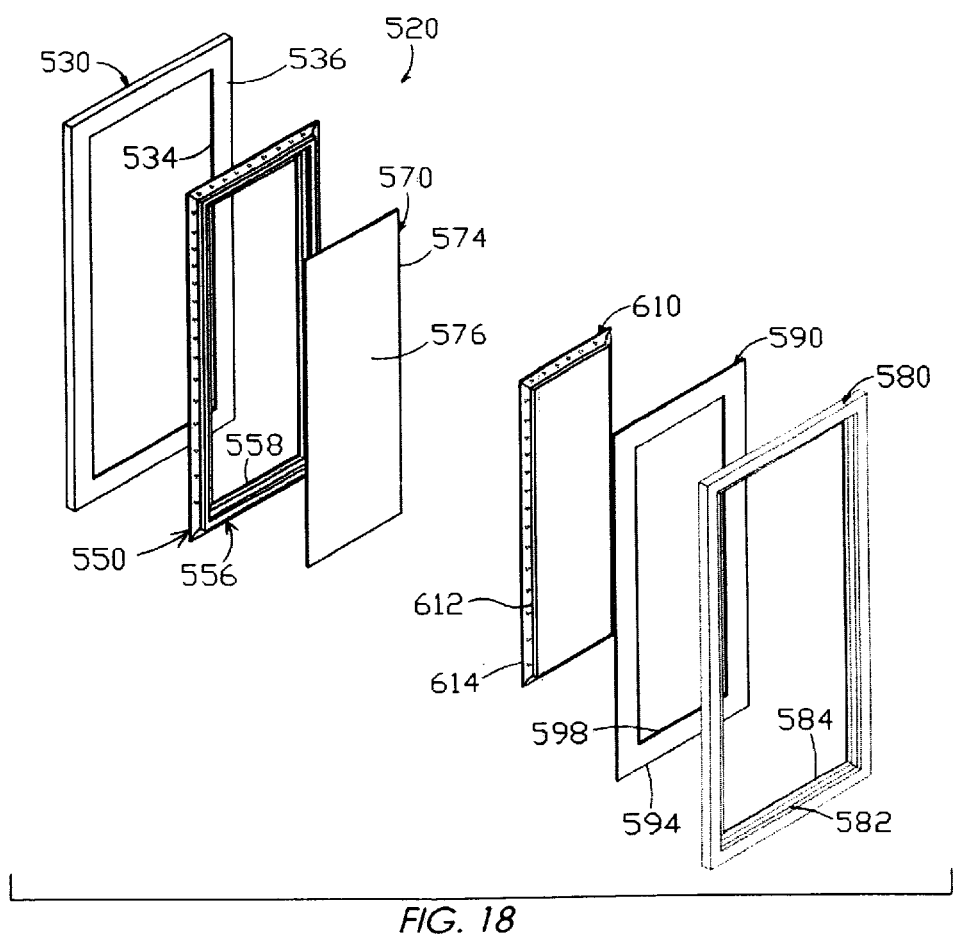
FIG. 18 is an exploded perspective view of another alternate embodiment of the apparatus of the present invention.

FIG. 18 is an exploded perspective view of apparatus 520 for use in a relatively thin inside door. FIG. 19 is a perspective view of the assembled apparatus 520. FIG. 20 is a view in partial section of the assembled apparatus 520. For the following discussion, reference will be made to all of the FIGS. 18, 19, and 20.

Six elements are shown for the apparatus 520, including an inside outer frame 530, an inside center frame 550, an inside center panel 570, an outside outer frame 580, an outside center frame 590, and an outside center panel 610. All of the six elements have flat backs for assembling the apparatus together back to back, as shown in FIG. 20.

The inside outer frame 530 includes an inner peripheral concave quarter groove 532, and the groove terminates in a tip 534. The frame 530 also includes a flat back 536.

Disposed within the inside outer frame 530 is the inside center frame 550. The frame 550 includes an outer peripheral concave quarter groove 552. The groove 552 terminates in a tip 534. The frame 550 also includes an inner peripheral concave quarter groove 556. The groove 556 terminates in a tip 580. The frame 550 includes a flat back 560.

Disposed within the inside outer frame 550 is an inside center panel 570. The panel 570 includes an outer peripheral concave quarter groove 572. The groove 572 terminates in a tip 574. The panel 570 also includes a flat back 576.

The three inside elements 530, 550, and 570 have three mirror images in outside elements 580, 590, and 610, respectively.

The outside element 580 is an outer frame element. The frame element 580 includes an inner peripheral concave quarter groove 582. The groove 582 terminates in a tip 584. The outer frame 580 has a flat back 586.

The outside element 590 is an outside center frame. The frame 590 includes an outer peripheral concave quarter groove 592. The groove 592 terminates in a tip 594.

The frame 590 also includes an inner peripheral concave quarter groove 596. The groove 596 terminates in a tip 598. The frame 590 also includes a flat back 600.

The outside element 610 comprises a center panel. The panel 610 includes an outer peripheral concave quarter groove 612. The groove terminates in a tip 614. Finally, the panel 610 also includes a flat back 616.

Referring now to FIG. 20, the six elements are shown secured together in a back to back relationship or orientation to provide three elements. The three elements are generally concentrically disposed. It will be noted that the respective adjacent quarter concave grooves define relatively widened concave generally U shaped half grooves into which the back to back tips extend so as to provide non-linear paths for the air flow from the inside of a room and through the door in which the apparatus 520 is installed to the return air space outside the room.

The depth to which the tips extend into their U shaped grooves determines the extent of the non-linearity of the air flow. The farther into the grooves that the tips extend provides the greatest degree of non-linearity for the air flow, and the greater the degree of privacy with respect to both light and sound penetration through the door.

Appropriate fastening means, not shown, such as pins, are used to secure the elements to each other and to door in which they are installed.

It will be noted that the tip and concave groove combinations may be reversed from that discussed and illustrated, if desired. For example, a tip may extend outwardly from a groove on the center frame and the tip may extend into a concave groove in the outer frame. The arrangement of the tips and grooves is immaterial.

Moreover, the manufacturing process discussed and illustrated may vary from that illustrated and discussed. For example, rather than use the six elements, only three elements may be used, with each of the three elements relatively thick to allow the groove and tip structure for the non-linear flow of air through a door. And depending on the size of a room and the air flow, perhaps only two frames, or a single frame and a center panel, may be required to provide the desired non-linear airflow through a door. Or, for a larger room, three or more frames may be required.

It will be noted that the privacy advantages of the embodiments of FIGS. 14-20 are diminished in the apparatus 520. The extent of the diminishment may depend on the depth of the quarter grooves and the extent to which the tips extend into the grooves, as discussed above.

However, an advantage of the embodiment of the apparatus 520 is that it may be configured in many designs. While a generally rectangular configuration is illustrated in FIGS. 18-20, it will be readily apparent that many irregular and curved configurations may be employed for esthetic purposes.

In addition to the depth to which a tip is extended into a groove, the configuration of the groove with respect to a smooth air flow is important. The aerodynamics of the groove for the smoothest air flow is desired. The smoother the air flow, the greater the efficiency of the air flow through a door, while still keeping the air flow non-linear, as discussed above.

While rounded concave elements have been shown and referred generally as "quarter concave grooves" and which are shown smoothly rounded for air flow purposes, straight, it will be understood that other configurations, such relatively straight, v-shaped grooves, may also be used, if desired. The general concept remains the same—it is the aerodynamic configuration of the grooves and the depth to which a tip is inserted into a groove that determines the air flow efficiency through a door.

It will be noted that the apparatus shown in FIGS. 14-20 may be inserted in both the upper and lower portions of a door, as required to provide the square inches necessary for the proper flow of air through the door. The apparatus of FIGS. 14-20 may also be inserted through walls, in transoms, etc., as desired to prevent the build up of pressure in a closed room.

Figures 21, 22:
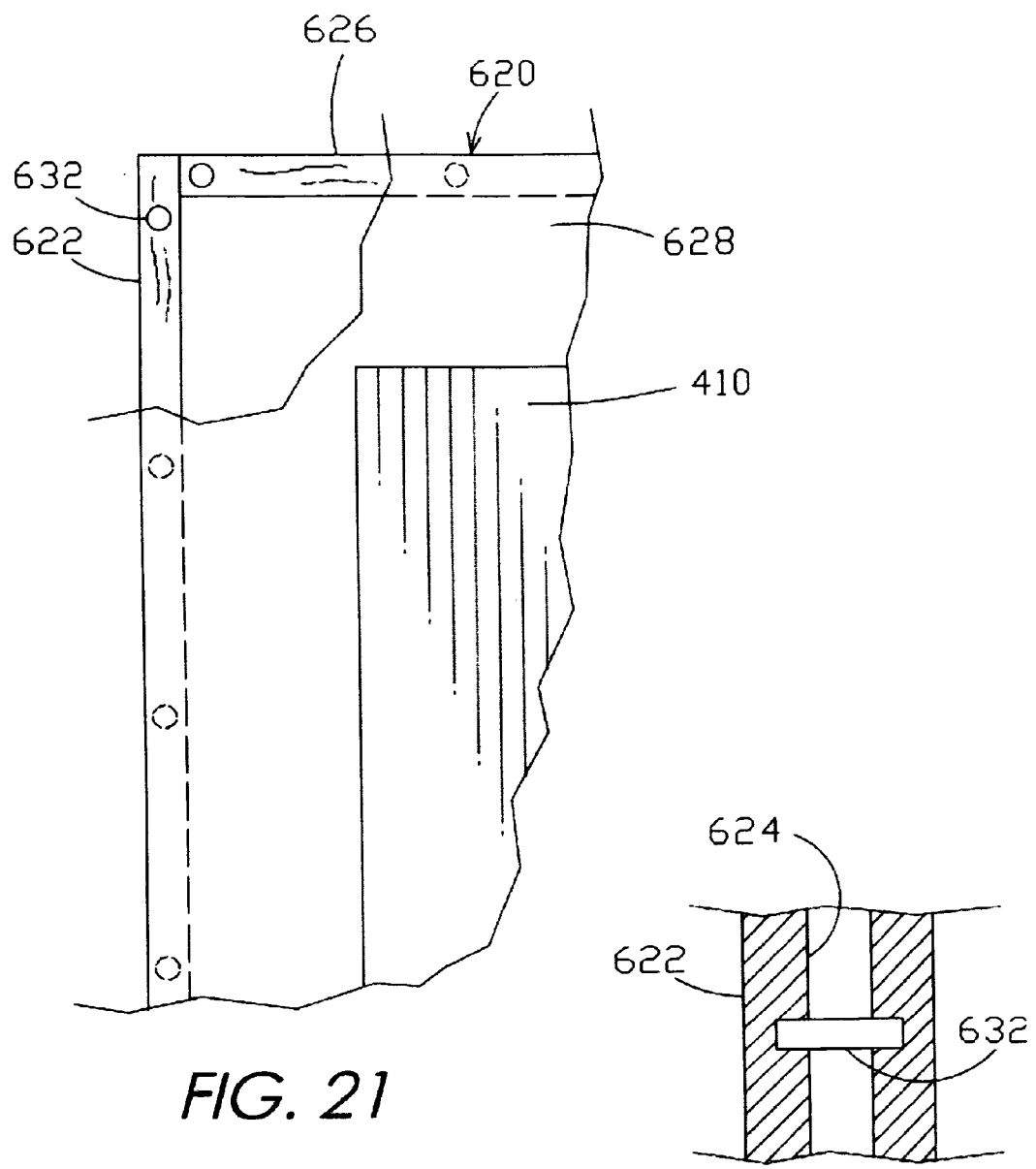
FIG. 21 is a fragmentary view, partially broken away, of a portion of another alternate embodiment of the present invention.
FIG. 22 is a fragmentary edge view of a portion of the apparatus of FIG. 21.

FIG. 21 is a fragmentary view, partially broken away, of a door 620 which combines the air scrubbing capabilities of the embodiments of FIGS. 1-13 with the air pressure build up prevention by non-linear air flow capabilities of FIGS. 14-20. FIG. 22 is a fragmentary edge view of a portion of the door apparatus of FIG. 21.

The door 620 includes a stile 622 and a rail 626. The door 620 is shown with an outer skin 628. A portion of the outer skin 628 is broken away to show details of the stile 622.

The stile 622 is split to provide an air passage into the hollow core interior of the door 620. As may be understood best from FIG. 22, the stile 622 is split and the two portions are spaced apart by a plurality of dowels 632. includes a passageway 624 vertically through the stile. A passageway 624 between the two portions of the stile allows air to flow laterally through the stile into the hollow core portions of the door. Scrubbing elements for removing noxious material, as discussed above for the embodiments of FIGS. 1-13, remove the noxious material from the air flow.

Similarly, the rail 626 is also split and uses dowels 632 to space apart the two portions of the rail. With split stiles and rails about the perimeter of the door, including reinforcing rails between the top and bottom rails, and holes through the bottom rail, as shown and discussed above in conjunction with the embodiments of FIGS. 1-13, and with the scrubbing material also discussed therewith, air flow through the door 620 performs air scrubbing functions, as well as preventing the build up of air pressure in a closed room when appropriate elements, such as the apparatus 410, are installed in the door.

The pressure of the flow of air into a room, such as the flow 404 of the room 400 of FIG. 14, will provide an air flow through the door 620 to a return air space and also through the stiles and rails for a scrubbing action. Air will thus flow through the door to prevent the build up of pressure and through the stiles and rails to the interior hollow core for the air flow to be scrubbed of noxious materials.

The privacy limitations of the apparatus of FIG. 20 may limit the use of that embodiment in applications other than in a narrow door. On the other hand, the relatively broad esthetic design advantages of the apparatus 520 may also make that apparatus advantageous in a generally full length configuration for a door.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

The invention claimed is:

1. A hollow core door apparatus for preventing pressure build up in a room having a register through which air flows into the room comprising in combination:
   an inside door skin;
   an opening in the inside door skin having an inner periphery;
   a first panel disposed adjacent to the opening in the inside door skin having an outer periphery;
   a space between the inner periphery of the opening in the inside door skin and and the outer periphery of the first panel providing a first area through which the air flows;
   an outside door skin;
   an opening in the outside door skin having an inner periphery;
   a second panel disposed adjacent to the opening in the outside door skin and having an inner periphery;
   a space between the inner periphery of the opening in the outside door skin and the outer periphery of the second panel providing a second area through which the air flows;
   a center panel disposed between the inside door skin and the outside door skin; and
   at least a single opening in the center panel comprising a total area of which opening is at least as great as the first area and as the second area whereby the air flows non-linearly from the register through the first area and through the opening in the center panel and through the second area to a return air space outside the room to prevent the build up of pressure in the room.

2. The hollow core door apparatus of claim 1 in which the center panel includes a plurality of openings, each of which has an area, and the total area of which openings is at least as great as the first area and as the second area.

3. The hollow core door apparatus of claim 1 which includes a plurality of spacers to secure the center panel to the first panel and to secure the second panel to the center panel.

4. The hollow core door apparatus of claim 1 in which the total area of the opening in the center panel is offset from the first area and from the second area whereby the flow of air through the door is non-linear.

5. The hollow core door apparatus of claim 1 in which the center panel is secured to the inside door skin and to the outside door skin.

6. The hollow core door apparatus of claim 1 in which the center panel includes a single opening and a plurality of spacers secured to the center panel and the spacers are disposed across the single opening and the plurality of spacers are secured to the first and second panels.

7. The hollow core door apparatus of claim 1 which further includes
   a pair of spaced apart stiles;
   a pair of spaced apart rails secured to the pair of spaced apart stiles;
   a passageway extending through at least one stile of the pair of stiles for providing a flow of air through the one stile of the pair of stiles and into the hollow core of the door;
   a passageway extending through at least one of the rails of the pair of rails for providing a flow of air through the one of the rails and into the hollow core of the door; and
   means for scrubbing noxious material from the flow of air through the one stile of the pair of stiles and through the one of the rails of the pair of rails into the hollow core of the door and through the first and second areas.

8. The hollow door apparatus of claim 7 which further includes
   a passageway in the other stile of the pair of stiles for providing a flow of air through both stiles; and
   a passageway in the other rail of the pair of rails for providing a flow of air through both rails of the pair of rails.

* * * * *